(12) United States Patent
Marsilia (10) Patent No.: US 9,682,626 B2
(45) Date of Patent: Jun. 20, 2017

(54) SYSTEM AND METHOD FOR MONITORING THE TORQUE SUPPLIED BY THE MOTOR OF AN ELECTRIC OR HYBRID MOTOR VEHICLE

(71) Applicant: RENAULT s.a.s., Boulogne Billancourt (FR)

(72) Inventor: Marco Marsilia, Boulogne Billancourt (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 14/783,036

(22) PCT Filed: May 28, 2014

(86) PCT No.: PCT/FR2014/051251
§ 371 (c)(1),
(2) Date: Oct. 7, 2015

(87) PCT Pub. No.: WO2014/202858
PCT Pub. Date: Dec. 24, 2014

(65) Prior Publication Data
US 2016/0068067 A1 Mar. 10, 2016

(30) Foreign Application Priority Data
Jun. 17, 2013 (FR) ...................................... 13 55620

(51) Int. Cl.
*B60L 3/00* (2006.01)
*B60L 15/20* (2006.01)
*F02D 41/22* (2006.01)

(52) U.S. Cl.
CPC .......... *B60L 3/0023* (2013.01); *B60L 3/0076* (2013.01); *B60L 15/20* (2013.01); *F02D 41/22* (2013.01);
(Continued)

(58) Field of Classification Search
USPC ...................................... 701/99, 53, 104, 22
See application file for complete search history.

(56) References Cited

U.S. PATENT DOCUMENTS 6,076,500 A * 6/2000 Clement ............. F02D 41/1497
123/339.16
6,236,931 B1 * 5/2001 Poggio ................ F02D 41/1401
123/305
(Continued)

FOREIGN PATENT DOCUMENTS

WO 2004/042884 A1 5/2004

OTHER PUBLICATIONS

International Search Report Issued Aug. 11, 2014 in PCT/FR14/051251 filed May 28, 2014.
(Continued)

*Primary Examiner* — Thomas Tarcza
*Assistant Examiner* — Richard Goldman
(74) *Attorney, Agent, or Firm* — Oblon, McClelland, Maier & Neustadt, L.L.P.

(57) ABSTRACT

A system for monitoring torque supplied by a motor of a motor vehicle, for example an electric or hybrid vehicle. The system includes a mechanism determining a driver's request for torque, a mechanism estimating torque produced by a propulsion unit, a mechanism filtering the driver torque request which is connected at an input to a mechanism determining consistency between the torque request and the torque produced including a mechanism determining consistency of positive torque and a mechanism determining consistency of negative torque each including a mechanism determining phases of quasi-static variation of the request and a mechanism detecting torque anomalies which can construct an acceptable torque template and determine that a torque anomaly has occurred as a function of the torque estimate, the torque request, and the acceptable torque template.

11 Claims, 3 Drawing Sheets

(52) U.S. Cl.
CPC . *B60L 2240/423* (2013.01); *F02D 2200/1004* (2013.01); *F02D 2200/60* (2013.01); *Y02T 10/40* (2013.01); *Y02T 10/645* (2013.01); *Y02T 10/72* (2013.01); *Y02T 10/7275* (2013.01)

(56) References Cited

U.S. PATENT DOCUMENTS

| | | | | |
|---|---|---|---|---|
| 6,772,059 | B2* | 8/2004 | Hellmann | B60K 31/04 |
| | | | | 180/179 |
| 2005/0000276 | A1 | 1/2005 | Bauer et al. | |
| 2005/0050965 | A1* | 3/2005 | Zaremba | B60K 6/48 |
| | | | | 73/862.08 |
| 2008/0315814 | A1* | 12/2008 | Takizawa | B60L 15/00 |
| | | | | 318/434 |
| 2012/0109431 | A1* | 5/2012 | Wang | B60L 3/0061 |
| | | | | 701/22 |
| 2015/0081183 | A1* | 3/2015 | Schueler | B60W 10/04 |
| | | | | 701/53 |
| 2015/0120116 | A1* | 4/2015 | Marsilia | H02P 29/0005 |
| | | | | 701/22 |
| 2016/0068067 | A1* | 3/2016 | Marsilia | B60L 3/0023 |
| | | | | 701/99 |

OTHER PUBLICATIONS

French Search Report Issued Mar. 18, 2014 in French Application No. 1355620 filed Jun. 17, 2013.

* cited by examiner

SYSTEM AND METHOD FOR MONITORING THE TORQUE SUPPLIED BY THE MOTOR OF AN ELECTRIC OR HYBRID MOTOR VEHICLE

The technical field of the invention is the monitoring of a propulsion unit of a motor vehicle, and more particularly monitoring of the torque supplied by the motor of an electric or hybrid vehicle.

To guarantee safe driving, it is necessary to monitor that the torque requested by the driver, via the accelerator pedal for example, is correctly produced by the vehicle.

This monitoring can be achieved in particular during the phases when the torque requested by the driver does not vary or varies in a low-dynamic fashion.

The monitoring allows detection of situations in which:
the torque produced by the motor is abnormally greater than the torque requested by the driver, also known as the driver's torque request, and
the torque produced by the motor is abnormally less than the torque requested by the driver.

The detection of such situations, usually known as "undesirable customer events" (or UCE), is essential since it then allows application of the most appropriate degraded mode to ensure the safety of the driver and vehicle. This takes the form for example of reducing the torque to zero, illuminating an indicator lamp on the dashboard to inform the driver, or preventing the movement of the vehicle.

In the prior art, documents US2009066281, US2005050965, US2010042276 and FR1254994 are known. All these documents disclose torque monitoring strategies based on comparison of a tolerance threshold with the difference between the driver's torque request and one or more estimated torque figures.

There is a need for detection of an abnormal difference between the torque request and the torque produced, and for detection of an abnormal variation in this difference.

There is also a need for interpretation of the current situation when a difference is detected between the torque request and the torque produced, and/or when an abnormal variation in this difference is detected.

One object of the present application is a system for monitoring the torque supplied by the motor of a motor vehicle, notably of an electric or hybrid vehicle. The system comprises a means for determining the driver's torque request, a means for estimating the torque produced by the propulsion unit, a means for filtering the driver's torque request which is connected at an input to a means for determining the consistency between the torque request and the torque produced, comprising a means for determining the consistency of the positive torque and a means for determining the consistency of the negative torque, each comprising a means for determining quasi-static variation phases of the request, and a means for detecting torque anomalies, which is able to construct an acceptable torque template and to determine the occurrence of a torque anomaly as a function of the torque estimate, the torque request and the acceptable torque template.

The term "quasi-static variation phases of the request" means the phases during which the driver's torque request does not vary or varies in a low-dynamic fashion.

The means for determining the quasi-static variation phases of the request may receive, as input, signals carrying the estimate of the torque produced by the propulsion unit, the driver's torque request and the filtered driver's torque request.

The means for determining the quasi-static variation phases of the request may be able to determine a Boolean value indicating the quasi-static variation phase and a mean value of the error percentage between the torque request and the estimate of the torque produced, measured over a period of set duration extending before the start of a quasi-static variation phase of the driver's torque request, as a function in particular of the comparison of the filtered driver's torque request with a set threshold.

The means for detecting torque anomalies may each be able to construct an acceptable torque template comprising an upper limit and a lower limit as a function of the torque request, the value of the mean error percentage measured over a period of set duration extending before the start of a quasi-static variation phase of the driver's torque request, and memorized parameters relating to the acceptable error and the acceptable error variation existing between the torque request and the torque estimate.

A first means for detecting torque anomalies may be able to detect a loss of propulsion, an untimely braking and an untimely acceleration in the case where the driver's torque request is positive. These detections may be performed as a function of the driver's torque request, the estimate of the torque produced by the propulsion unit, a Boolean for detecting the quasi-static variation phase, a value of the mean error percentage measured over a period of set duration extending before the start of a quasi-static variation phase of the driver's torque request, and a Boolean for updating the mean value of the error percentage measured over a period of set duration extending before the start of a quasi-static variation phase of the driver's torque request, and the acceptable torque template.

A second means for detecting torque anomalies may be able to detect an untimely acceleration in the case where the driver's torque request is negative, an overbraking, and a loss of braking. These detections may be performed as a function of the driver's torque request, the estimate of the torque produced by the propulsion unit, and the Boolean for detecting the quasi-static variation phase, the value of the mean error percentage measured over a period of set duration extending before the start of a quasi-static variation phase of the driver's torque request, a Boolean for updating the mean value of the error percentage measured over a period of set duration extending before the start of a quasi-static variation phase of the driver's torque request, and the acceptable torque template.

Another object of the present application is a method for monitoring the torque supplied by the motor of a motor vehicle, notably of an electric or hybrid vehicle. The method comprises the following steps:
determination of the driver's torque request,
estimation of the torque produced by the propulsion unit,
filtration of the driver's torque request,
determination of the occurrence of a quasi-static variation phase of the torque request,
determination of a torque template, then during a quasi-static variation phase of the torque request, determination that a torque anomaly is present as a function of the torque estimate, the torque request and the acceptable torque template.

A template may be constructed comprising an upper limit of torque output and a lower limit of torque output as a function of the torque request, the mean value of the error percentage between the torque request and the estimate of the torque produced, measured over a period of set duration extending before the start of a quasi-static variation phase of the driver's torque request, and memorized parameters relative to the acceptable error and acceptable error variation existing between the torque request and the torque estimate.

During a quasi-static variation phase when the driver's torque request is positive, if the torque estimate exceeds the upper template limit, it may be determined that the torque anomaly detected is an untimely acceleration when the driver's torque request is positive.

The term "positive driver's torque request" means a request for torque to accelerate the vehicle which is moving forward with a positive speed.

During a quasi-static variation phase when the driver's torque request is positive, if the torque estimate falls below the lower template limit, it may be determined that the torque anomaly detected is a loss of propulsion.

During a quasi-static variation phase when the driver's torque request is negative, if the torque estimate falls below the lower template limit, it may be determined that the torque anomaly detected is an overbraking.

The term "negative driver's torque request" means a request for torque to decelerate the vehicle which is moving forward with a positive speed.

During a quasi-static variation phase when the driver's torque request is negative, if the torque estimate exceeds the upper template limit, it may be determined that the torque anomaly detected is a loss of braking.

During a quasi-static variation phase when the driver's torque request is positive, and if the estimate of torque produced by the propulsion unit is both negative and below a specific threshold for the case of a positive driver's torque request, and less than the driver's torque request by a value at least equal to the value of another specific threshold for the case of a positive driver's torque request, it may be determined that the torque anomaly is an untimely braking.

During a quasi-static variation phase when the driver's torque request is negative, and if the estimate of torque produced by the propulsion unit is both positive and above a specific threshold for the case of a negative driver's torque request, and greater than the driver's torque request by a value at least equal to the value of another specific threshold for the case of a negative driver's torque request, it may be determined that the torque anomaly is an untimely acceleration.

The method and the system thus perform the monitoring not only of the error between the driver's torque request and the estimate of the torque produced by the motor, but also of the variation in this error over time.

Furthermore, the method and the system perform a monitoring limited to the phases in which the driver's torque request does not vary or varies in a low-dynamic fashion, thus avoiding "false detection" of UCEs linked to exceedance of the template during the dynamic variation phases of the request.

Further aims, characteristics and advantages will appear from reading the description below, which is given purely as a non-limitative example, with reference to the attached drawings on which:

Figure 1:
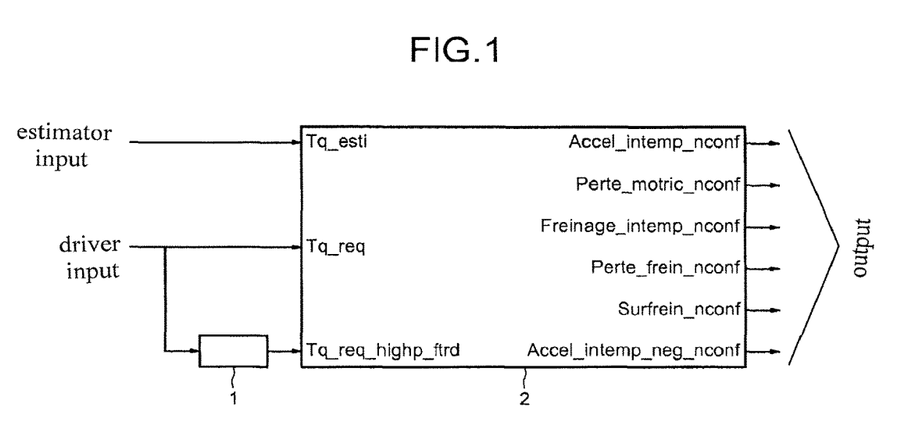
FIG. 1 illustrates the main elements of a system for determining a torque anomaly.

FIG. 1 shows the means 1 for filtering the driver's torque request, which performs a high-pass filtering of the driver's torque request designated Tq_req. More precisely, the means 1 for filtering the driver's torque request performs a high-pass filtering of the first order at the cutoff pulse wc_tq_sp_highp_ftr. The cutoff pulse is advantageously selected to reduce the signal noise.

The transfer function in the continuous field of this filter is:

$$F(s) = \frac{s}{1 + \frac{s}{wc\_tq\_sp\_highp\_ftr}} \quad \text{(Eq. 1)}$$

where s: Laplace's variable.

The means 1 for filtering the driver's torque request outputs the filtered driver's torque request, designated Tq_req_highp_ftrd.

The means 2 for determining the consistency between the torque request and the torque produced verifies the consistency between the driver's torque request Tq_req and the estimate of the torque produced by the motor Tq_esti. The description below is based on a motor vehicle fitted with an electric motor. However, the person skilled in the art will generalize the teaching of the present application to a propulsion unit comprising in particular an arbitrary combination of an internal combustion engine and electrical machines. The means 2 for determining the consistency between the torque request and the torque produced is also illustrated by FIG. 1, which shows that it receives as input the estimate of the torque produced by the motor Tq_esti, the driver's torque request Tq_req, and the filtered driver's torque request Tq_req_highp_ftrd received from the means 1 for filtering the driver's torque request.

The estimate of the torque produced by the motor Tq_esti may be determined for example by measurement of stator and rotor currents.

The driver's torque request Tq_req expresses the driver's desire to accelerate or decelerate, and may be determined for example as a function of the extent to which the accelerator pedal is depressed.

The means 2 for determining the consistency between the torque request and the torque produced outputs signals of detection of an anomaly in the difference between the torque produced and the torque required, and/or an abnormal variation in this difference. Torque anomalies are undesirable events for the driver (UCE).

The signals of detection of a torque anomaly comprise signals carrying a Boolean for detecting an untimely acceleration when the driver's torque request is positive, designated Accel_intemp_nconf, a Boolean for detecting an untimely acceleration when the driver's torque request is negative, designated Accel_intemp_neg_nconf, a Boolean for detecting a situation of loss of propulsion, designated Perte_motric_nconf, a Boolean for detecting the situation of untimely braking, designated Freinage_intemp_nconf, a Boolean for detecting a situation of overbraking, designated Surfrein_nconf, and a Boolean for detecting the situation of loss of braking, designated Perte_frein_nconf.

The term "untimely acceleration" means a situation where the torque produced by the motor is positive and abnormally higher than the driver's torque request.

The term "loss of propulsion" means that, when the driver's torque request is positive, the torque produced by the motor—although positive—is abnormally lower than the level which the driver expects.

The term "overbraking" means that the driver's torque request is negative but the torque produced by the motor is abnormally lower, while remaining higher in absolute value, than the level which the driver expects.

The term "untimely braking" means that the driver's torque request is positive or zero but the torque produced by the motor is negative.

The term "loss of braking" means that the driver's torque request is negative but the torque produced by the motor—although negative—is abnormally higher, while remaining lower in absolute value, than the level which the driver expects.

Figure 2:
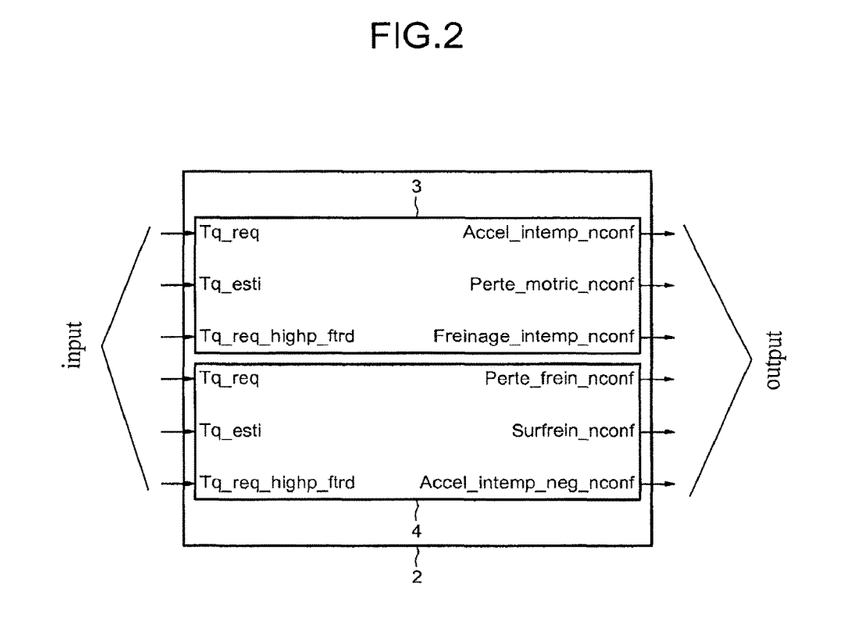
FIG. 2 illustrates the main elements of a means for determining the consistency between the torque request and the torque produced.

FIG. 2 shows that the means 2 for determining the consistency between the torque request and the torque produced comprises a means 3 for determining the consistency of the positive torque and a means 4 for determining the consistency of the negative torque.

The means 3 for determining the consistency of the positive torque verifies the consistency of the torque during the phases in which the driver's torque request is positive while varying in a low-dynamic fashion. The means 3 for determining the consistency of the positive torque, illustrated in FIG. 3, comprises a means 5 for determining the quasi-static variation phases of the positive request and a first means 6 for detecting torque anomalies.

Figure 4:
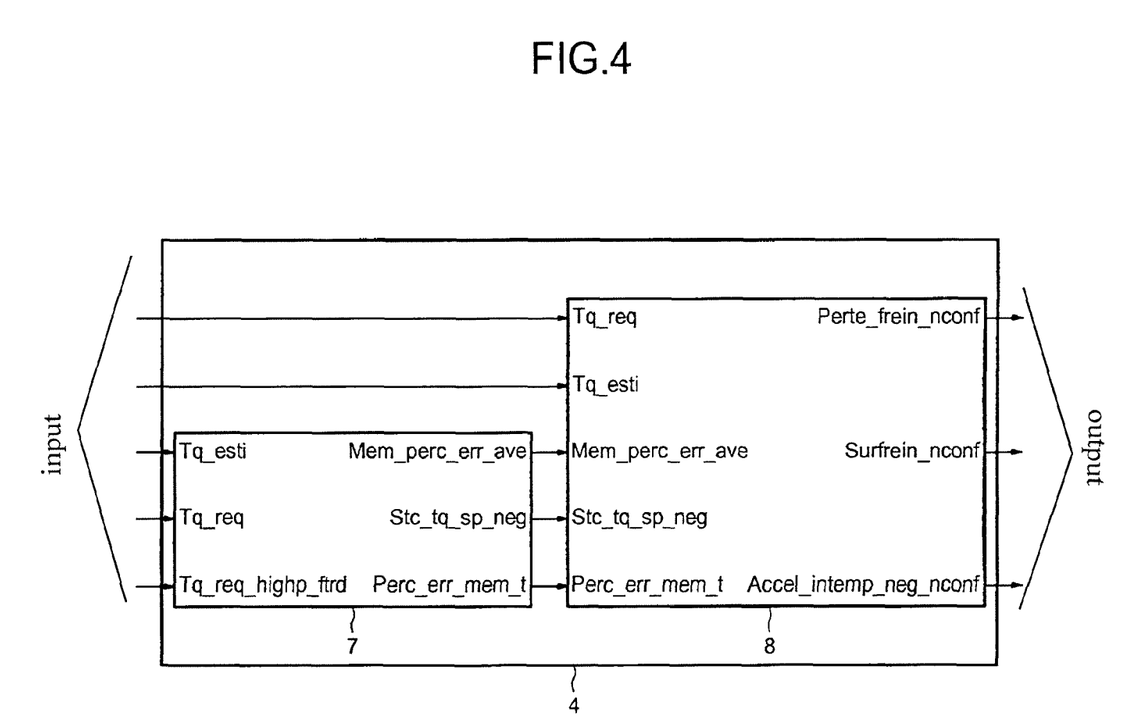
FIG. 4 illustrates the main elements of a means for determining the consistency of the negative torque in a quasi-static phase.

The means 4 for determining the consistency of the negative torque will be described below with reference to FIG. 4.

Figure 3:
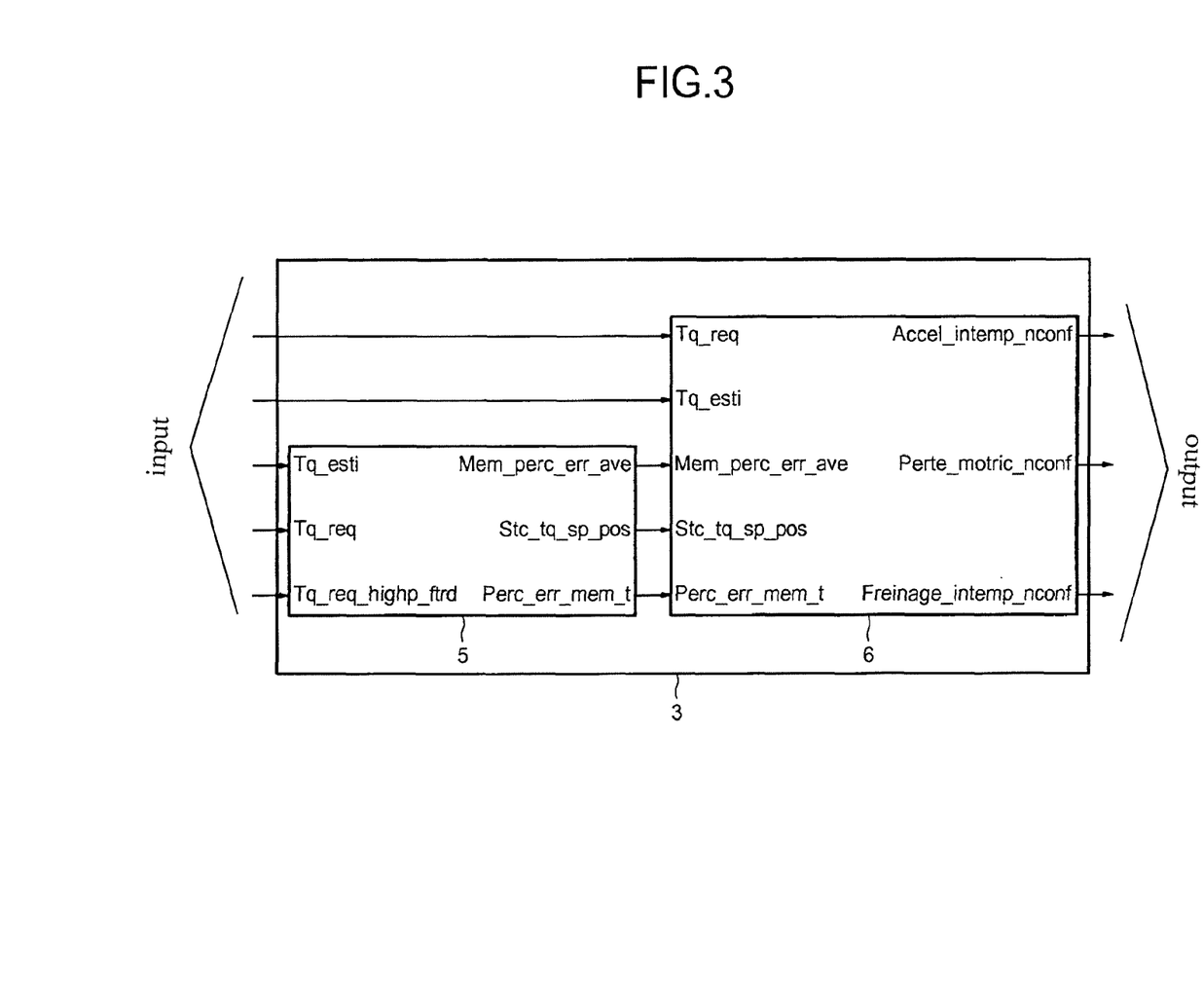
FIG. 3 illustrates the main elements of a means for determining the consistency of the positive torque in a quasi-static phase.

The means 5 for determining the quasi-static variation phases of the positive request determines the phases during which the driver's torque request does not vary or varies in a "low-dynamic" fashion.

The means 5 for determining the quasi-static variation phases of the positive request receives, as input, signals carrying the estimate of the torque produced by the motor Tq_esti, the driver's torque request Tq_req, and the filtered driver's torque request Tq_req_highp_ftrd received from the means 1 for filtering the driver's torque request.

The means 5 for determining the quasi-static variation phases of the positive request outputs signals carrying a Boolean for detecting the quasi-static variation phase when the driver's torque request is positive, designated stc_tq_sp_pos, a mean value for the error percentage measured in the instants "directly preceding" the start of a quasi-static variation phase of the driver's torque request, designated mem_perc_err_ave, and a Boolean for updating the mean value of the error percentage measured in the instants "directly preceding" the start of a quasi-static variation phase of the driver's torque request, designated perc_err_mem_t. The concept of instants "directly preceding" the start of a quasi-static variation phase of the driver's torque request will be defined below.

The Boolean stc_tq_sp_pos passes from value 0 to value 1 each time the following two conditions are verified:

$$|Tq\_req\_highp\_ftrd| < Cxx\_tq\_sp\_highp\_stc\_thd$$

during a first duration T1, and $$Tq\_req \geq -Cxx\_zero\_tq \quad \text{(Eq. 2)}$$

where:
Cxx_tq_sp_highp_stc_thd: frequency below which the driver's torque request is considered to vary in a quasi-static fashion.
T1: duration characteristic of a quasi-static variation in the driver's torque request.
Cxx_zero_tq: torque above which the monitoring performed by the means 3 for determining the consistency of the positive torque is active.

The start of a quasi-static variation phase is therefore detected when the high-pass filtered request Tq_req_highp_ftrd has remained below the threshold Cxx_tq_sp_highp_stc_thd for the first duration T1.

The signal stc_tq_sp_pos passes from value 1 to value 0 each time at least one of the following conditions is verified:

$$|Tq\_req\_highp\_ftrd| \geq Cxx\_tq\_sp\_highp\_stc\_thd,$$

or $$Tq\_req < -Cxx\_zero\_tq \quad \text{(Eq. 3)}$$

The determination of the signal mem_perc_err_ave will now be described. The signal mem_perc_err_ave takes the mean value of the error percentage perc_err_ave each time the Boolean perc_err_mem_t takes the value 1. When the Boolean perc_err_mem_t takes the value 0, the signal mem_perc_err_ave remains fixed at its preceding value.

The signal for the mean error percentage perc_err_ave is obtained by applying the following equations:

$$\text{perc\_err} = 100 \cdot \frac{Tq\_esti - Tq\_Req}{\max(Tq\_Req; Cxx\_tq\_min\_calc\_perc\_err)} \quad \text{(Eq. 4)}$$

$$\text{perc\_err\_int} = \int_{t0-T2}^{t0} (\text{perc\_err}) dt$$

$$\text{perc\_err\_ave} = \frac{\text{perc\_err\_int}}{T2}$$

where t0=start of a quasi-static phase of the driver's torque request, and
Cxx_tq_min_calc_perc_err: minimum value of the torque request to be taken into account for calculation of the error percentage.

$$T2=(T1)/2$$

It is to be noted that the minimum value of the torque request to be taken into account for calculating the error percentage Cxx_tq_min_calc_perc_err ensures that the value of the error percentage perc_err retains a sense when the value for torque required is very low. In other words, the value Cxx_tq_min_calc_perc_err and the determination of the maximum value between the torque request Tq_req and the value Cxx_tq_min_calc_perc_err avoids a situation close to division by zero.

Thus the variable perc_err_int is determined by integrating the percentage error perc_err between instants t0-T2 and T2.

Then the variable perc_err_ave is determined by dividing the variable perc_err_int by the integration duration T2.

It thus appears that the variable perc_err_int, which underlies the determination of torque anomalies is determined over a time period extending from t0-T2 to t0, which corresponds to the instants "directly preceding" the start of a quasi-static variation phase of the driver's torque request.

The Boolean for updating the mean value of the error percentage measured in the instants "directly preceding" the start of a quasi-static variation phase of the driver's torque request, designated perc_err_mem_t, takes the value 1 when the signal stc_tq_sp_pos passes from a value 0 to a value 1. The passage to the value 1 of this signal marks the start of a new quasi-static variation phase of the driver's torque request.

In other words, a new mean error percentage mem_perc_err_ave is therefore set each time a new quasi-static variation phase is detected.

The first means 6 for detecting torque anomalies allows detection of a loss of propulsion, an untimely braking and an untimely acceleration in the case where the driver's torque request is positive.

The first means 6 for detecting torque anomalies receives, as input, the driver's torque request Tq_req and the estimate of the torque produced by the motor Tq_esti, and also receives as input, from the means 5 for detecting quasi-static variation phases of the positive request, a Boolean for detecting quasi-static variation phases designated stc_tq_sp_pos, a value for the mean error percentage measured in the instants "directly preceding" the start of a quasi-static variation phase of the driver's torque request, designated mem_perc_err_ave, and a Boolean for updating the mean value of the error percentage measured in the instants "directly preceding" the start of a quasi-static variation phase of the driver's torque request, designated perc_err_mem_t.

The first means 6 for detecting torque anomalies outputs the Boolean for detecting an untimely acceleration when the driver's torque request is positive, designated Accel_intemp_nconf, the Boolean for detecting a situation of loss of propulsion, designated Perte_motric_nconf, and the Boolean for detecting the situation of untimely braking, designated Freinage_intemp_nconf.

The method for determining a torque anomaly comprises the construction of an acceptable torque template. An anomaly is detected if the estimate of the torque produced by the motor Tq_esti lies outside this template. The torque template is constructed as a function of the maximum acceptable static error between the driver's torque request and the torque produced by the motor, the mean error percentage measured in the instants "directly preceding" the start of a quasi-static phase mem_perc_err_ave, and the variation in the driver's torque request during the quasi-static phase.

Taking account of the mean error percentage measured in the instants "directly preceding" the start of a quasi-static phase mem_perc_err_ave, and the variation in the driver's torque request during the quasi-static phase, allows the variation in static error to be monitored.

The torque template is delimited by the limits which the torque estimate must not exceed while the driver's torque request is positive, the upper limit of the torque template being designated h_lim_stc_pos and the lower limit of the torque template being designated l_lim_stc_pos. The values of the upper and lower limits are defined by the following equations:

$$\begin{cases} h\_lim\_stc\_pos = \min(h\_lim\_err\_stat; h\_lim\_variat\_err\_stat) \\ l\_lim\_stc\_pos = \max(l\_lim\_err\_stat; l\_lim\_variat\_err\_stat) \end{cases} \quad (Eq.\ 5)$$

where:

h_lim_err_stat: value of the upper limit of acceptable error l_lim_err_stat: value of the lower limit of acceptable error h_lim_variat_err_stat: value of the upper limit of variation in acceptable error l_lim_variat_err_stat: value of the lower limit of variation in acceptable error The values of the limits of acceptable error h_lim_err_stat and l_lim_err_stat are a function respectively of the acceptable error percentage for the upper limit of the torque template Cxx_perc_err_max_h_pos and the acceptable error percentage for the lower limit of the torque template Cxx_perc_err_max_l_pos.

$$\begin{cases} h\_lim\_err\_stat = Tq\_req + A \\ l\_lim\_err\_stat = Tq\_req - B \end{cases} \quad (Eq.\ 6)$$

where:

$$A = \max\left(Cxx\_err\_tq\_min\_pos;\ \frac{Cxx\_perc\_max\_h\_pos}{100} \cdot Tq\_req\right)$$

$$B = \max\left(Cxx\_err\_tq\_min\_pos;\ \frac{Cxx\_perc\_max\_l\_pos}{100} \cdot Tq\_req\right)$$

Cxx_err_tq_min_pos: acceptable error in the case of a positive driver's torque request.

Cxx_perc_err_max_h_pos: acceptable error percentage for the upper limit of the torque template in the case of a positive driver's torque request (as % of the driver's torque request).

Cxx_perc_err_max_l_pos: acceptable error percentage for the lower limit of the torque template in the case of a positive driver's torque request (as % of the driver's torque request).

In the equations Eq. 5, the values of the acceptable error limits h_lim_variat_err_stat and l_lim_variat_err_stat allow determination of whether the variation in the torque difference is abnormal. The following equations serve to determine these:

$$\begin{cases} h\_lim\_variat\_er\_stat = Tq\_Req\_Recal + Delta\_h \\ l\_lim\_variat\_er\_stat = Tq\_Req\_Recal - Delta\_l \end{cases} \quad (Eq.\ 7)$$

where:

Tq_Req_Recal: sum of the driver's torque request and the mean static error determined in the instants "directly preceding" the start of a quasi-static phase.

Delta_h: value of the upper limit of the maximum acceptable error variation relative to the error measured at the start of the quasi-static phase.

Delta_l: value of the lower limit of the maximum acceptable error variation relative to the error measured at the start of the quasi-static phase.

The following equation summarizes the determination of the variable Tq_Req_Recal.

$$Tq\_Req\_Recal = Tq\_Req \cdot \left(1 + \frac{mem\_perc\_err\_ave}{100}\right) \quad (Eq.\ 8)$$

At the start of the quasi-static phase, the sum of the driver's torque request and the mean static error measured in the instants "directly preceding" the start of a quasi-static phase Tq_Req_Recal represents the torque perceived by the driver. During the quasi-static phase, this signal develops in the same fashion as the driver's torque request Tq_Req.

The variables Delta_h and Delta_l fix the maximum acceptable error variation relative to the error measured at the start of the quasi-static phase. The following equations summarize the determination of the variables Delta_h and Delta_l:

$$\begin{cases} \text{Delta\_h} = \max(\text{Cxx\_delta\_err\_tq\_min\_pos}; \text{Tq\_Req} \cdot Ah) \\ \text{Delta\_l} = \max(\text{Cxx\_delta\_err\_tq\_min\_pos}; \text{Tq\_Req} \cdot Al) \end{cases} \quad \text{(Eq. 9)}$$

where $$Ah = \frac{\text{Cxx\_delta\_perc\_err\_init\_h\_pos} + \text{delta\_perc\_err\_augm\_h}}{100}$$

$$Al = \frac{\text{Cxx\_delta\_perc\_err\_init\_l\_pos} + \text{delta\_perc\_err\_augm\_l}}{100}$$

(Eq. 10)

$$\begin{cases} \text{delta\_perc\_err\_augm\_h} = \min(\text{Cxx\_delta\_perc\_err\_max\_h\_pos}; Bh) \\ \text{delta\_perc\_err\_augm\_l} = \min(\text{Cxx\_delta\_perc\_err\_max\_l\_pos}; Bl) \end{cases}$$

$$Bh = \int_{T3} \text{Cxx\_perc\_err\_drv\_tq\_h\_lim\_pos} \cdot \partial t$$

$$Bl = \int_{T3} \text{Cxx\_perc\_err\_drv\_tq\_l\_lim\_pos} \cdot \partial t$$

T3=duration of the quasi-static phase. The calculation integrals of Bh and Bl are reset to 0 when the value perc_err_mem_t takes the value 1.

Cxx_delta_err_tq_min_pos: acceptable error variation in the case of a positive driver's torque request, Cxx_delta_perc_err_init_h_pos: acceptable error variation as a percentage of the driver's torque request at the instant of start of the quasi-static phase, for the upper limit of the torque template, Cxx_delta_perc_err_init_l_pos: acceptable error variation as a percentage of the driver's torque request at the instant of start of the quasi-static phase, for the lower limit of the torque template, Cxx_perc_err_dry_tq_h_lim_pos: temporal derivative of acceptable error for the upper limit of the torque template, Cxx_perc_err_dry_tq_l_lim_pos: temporal derivative of acceptable error for the lower limit of the torque template, Cxx_delta_perc_err_max_h_pos: upper saturation value of the signal delta_perc_err_augm_h, Cxx_delta_perc_err_max_l_pos: lower saturation value of the signal delta_perc_err_augm_l;

delta_perc_err_augm_h, delta_perc_err_augm_l: acceptable increase in the error over time as a percentage.

It should be noted that a slow increase in the error is acceptable since the driver has the time to react in compensation. The parameter Cxx_perc_err_dry_tq_h_lim_pos allows quantification of the acceptable rate of increase of the error over time.

Also, Cxx_delta_perc_err_max_h_pos therefore limits the increase in Cxx_perc_err_drv_tq_l_lim_pos.

The combination of equations Eq. 5 to Eq. 10 gives the upper template limit h_lim_stc_pos and the lower template limit l_lim_stc_pos.

As has been described above, a torque anomaly is detected if the estimate of the torque produced by the motor Tq_esti moves outside the template formed by the upper template limit h_lim_stc_pos and the lower template limit l_lim_stc_pos during a quasi-static phase of the driver's torque request, identified for example by the value of the Boolean for detecting the quasi-static variation phase when the driver's torque request is positive stc_tq_sp_pos. More precisely, when the value of the Boolean stc_tq_sp_pos for detecting the quasi-static variation phase when the driver's torque request is positive indicates that such a phase is in progress, an untimely acceleration is detected if the torque estimate exceeds the upper template limit h_lim_stc_pos and a loss of propulsion is detected if the torque estimate falls below the lower template limit l_lim_stc_pos.

The Boolean for detecting an untimely acceleration when the driver's torque request is positive, designated Accel_intemp_nconf, then changes value. Similarly, the Boolean for detecting a situation of loss of propulsion, Perte_motric_nconf, changes value. In contrast to detection of an untimely acceleration and loss of propulsion, an untimely braking is detected independently of the torque template.

An untimely braking is detected if the driver's torque request Tq_req is positive, if the value of the Boolean for detecting the quasi-static variation phase when the driver's torque request is positive stc_tq_sp_pos corresponds to the detection of such a phase, and if the estimate of the torque produced by the motor Tq_esti is both negative and lower than the torque Cxx_tq_uex_brak below which an untimely braking may be detected, and lower than the driver's torque request Tq_req by a value at least equal to the minimum torque difference Cxx_delta_tq_min_uex_brak between the driver's torque request Tq_req and the estimate of the torque produced by the motor Tq_esti in order to be able to detect an untimely braking.

The means 4 for determining the consistency of the negative torque verifies the consistency of the torque during the phases in which the driver's torque request is negative while varying in a "low-dynamic" fashion. The means 4 for determining the consistency of the negative torque, illustrated by FIG. 4, comprises a means 7 for determining the quasi-static variation phases of the negative request and a second means 8 for detecting torque anomalies.

In contrast to the means 5 for determining the quasi-static variation phases of the positive request, the means 7 for determining the quasi-static variation phases of the negative request performs the recognition of the quasi-static variation phases of the driver's torque request in the case where the driver's torque request is negative. The determination means 7 has a similar structure to the determination means 5 and differs only in the output signals.

The determination means 7 outputs signals carrying a Boolean for detecting the quasi-static variation phase when the driver's torque request is negative, designated stc_tq_sp_neg, a value for the mean error percentage measured in the instants "directly preceding" the start of a quasi-static variation phase of the driver's torque request, designated mem_perc_err_ave, and a Boolean for updating the mean value of the error percentage measured in the instants "directly preceding" the start of a quasi-static variation phase of the driver's torque request, designated perc_err_mem_t.

The second means 8 for detecting torque anomalies allows detection of torque anomalies in a similar fashion to the first means 6 for detecting torque anomalies. In the case of the second means 8, the anomalies detected are a loss of braking, an overbraking and an untimely acceleration in the case where the driver's torque request is negative.

The second means 8 receives, as input, the driver's torque request Tq_req and the estimate of the torque produced by the motor Tq_esti, and receives from the determination means 7 a Boolean for detecting the quasi-static variation phase, designated stc_tq_sp_neg, a value for the mean error percentage measured in the instants "directly preceding" the start of a quasi-static variation phase of the driver's torque request, designated mem_perc_err_ave, a Boolean for updating the mean value of the error percentage measured in the instants "directly preceding" the start of a quasi-static variation phase of the driver's torque request, designated perc_err_mem_t.

The second means 8 outputs the Boolean for detecting an untimely acceleration when the driver's torque request is negative, designated Accel_intemp_neg_nconf, the Boolean for detecting the situation of overbraking, designated Surfrein_nconf, and the Boolean for detecting the situation of loss of braking, designated Perte_frein_nconf.

The acceptable torque template is constructed in the second means 8 in a similar manner to that of the first means 6.

Similarly, the torque anomalies are detected in the second means 8 in a similar fashion to the detection performed in the first means 6. A torque anomaly is detected if the estimate of the torque produced by the motor Tq_esti moves outside a torque template when the driver's torque request is negative during a quasi-static phase of the driver's torque request, identified for example by the value of the Boolean stc_tq_sp_neg for detecting the quasi-static variation phase when the driver's torque request is negative.

The torque template, when the driver's torque request is negative, comprises an upper limit of the torque template when the driver's torque request is negative, designated h_lim_stc_neg, and a lower limit of the torque template when the driver's torque request is negative, designated l_lim_stc_neg.

More precisely, when the value of the Boolean stc_tq_sp_neg for detecting the quasi-static variation phase when the driver's torque request is negative indicates that such a phase is in progress, a loss of braking is detected if the torque estimate exceeds the upper template limit h_lim_stc_neg, and an overbraking is detected if the torque estimate falls below the lower template limit l_lim_stc_neg.

This is expressed by the change in value of the Boolean Perte_frein_nconf indicating a loss of braking, and of the Boolean Surfrein_nconf indicating an overbraking.

In contrast to the loss of braking and overbraking, an untimely acceleration (in the case of a negative driver's torque request) is detected independently of the torque template.

An untimely acceleration is detected if the driver's torque request Tq_req is negative, if the value of the Boolean for detecting the quasi-static variation phase when the driver's torque request is negative stc_tq_sp_neg corresponds to the detection of such a phase, and if the estimate of the torque produced by the motor Tq_esti is both positive and higher than the torque Cxx_tq_uex_acc_neg above which an untimely acceleration may be detected, in the case of a negative driver's torque request, and higher than the driver's torque request Tq_req by a value at least equal to the minimum torque difference Cxx_delta_tq_min_uex_acc between the driver's torque request Tq_req and the estimate of the torque produced by the motor Tq_esti in order to be able to detect an untimely acceleration, in the case of a negative driver's torque request.

The method and the system described above allow detection of torque anomalies between the torque requested by the driver and the torque produced by the motor of a motor vehicle. Once detected, the torque anomalies are identified in order for the driving assistance systems fitted to the vehicle to be able to apply a response adapted to the situation.

The invention claimed is:

1. A system for monitoring torque supplied by a prime mover of a motor vehicle, or an electric or hybrid vehicle, comprising:

circuitry configured to
determine a driver's torque request,
estimate torque produced by a propulsion unit,
filter the driver's torque request,
determine consistency between the torque request and torque produced considering quasi-static variation phases of the request by receiving, as an input, signals carrying the estimate of the torque produced by the propulsion unit, the driver's torque request and the filtered driver's torque request,
and detecting torque anomalies by constructing a torque specification and determining occurrence of a torque anomaly as a function of the torque estimate, the torque request, and the torque specification, and
determine the quasi-static variation phases of the request by determining a Boolean value indicating a quasi-static variation phase and a mean value of error percentage between the torque request and the estimate of the torque produced, measured over a period of set duration extending before a start of a quasi-static variation phase of the driver's torque request, as a function of comparison of the filtered driver's torque request with a set threshold.

2. The system as claimed in claim 1, wherein the circuitry is further configured to detect torque anomalies by constructing the torque specification comprising an upper limit and a lower limit as a function of the torque request, the value of the mean error percentage measured over a period of set duration extending before the start of the quasi-static variation phase of the driver's torque request, and stored parameters relating to an acceptable error and an acceptable error variation existing between the torque request and the torque estimate.

3. The system as claimed in claim 2, wherein the circuitry is further configured to detect torque anomalies by detecting a loss of propulsion, an untimely braking, and an untimely acceleration in a case that the driver's torque request is positive as a function of the driver's torque request, the estimate of the torque produced by the propulsion unit, the Boolean value indicating the quasi-static variation phase, the mean value of the error percentage measured over a period of set duration extending before the start of the quasi-static variation phase of the driver's torque request, and a Boolean value for updating the mean value of the error percentage measured over a period of set duration extending before the start of the quasi-static variation phase of the driver's torque request, and the torque specification.

4. The system as claimed in claim 2, wherein the circuitry is further configured to detect torque anomalies by detecting an untimely acceleration in a case that the driver's torque request is negative, an overbraking, and a loss of braking as a function of the driver's torque request, the estimate of the torque produced by the propulsion unit, and the Boolean value indicating the quasi-static variation phase, the mean value of the error percentage measured over a period of set duration extending before the start of the quasi-static variation phase of the driver's torque request, a Boolean value for updating the mean value of the error percentage measured over a period of set duration extending before the start of the quasi-static variation phase of the driver's torque request, and the torque specification.

5. A method for monitoring torque supplied by a prime mover of a motor vehicle, or an electric or hybrid vehicle using circuitry, comprising:

determining, using the circuitry, a driver's torque request;
estimating, using the circuitry, torque produced by a propulsion unit;

filtering, using the circuitry, the driver's torque request;
determining, using the circuitry, occurrence of a quasi-static variation phase of the torque request;
determining, using the circuitry, a torque specification comprising an upper limit and a lower limit as a function of the torque request, a mean value of an error percentage between the torque request and the estimate of the torque produced, measured over a period of set duration extending before a start of a quasi-static variation phase of the driver's torque request, and stored parameters relative to an acceptable error and acceptable error variation existing between the torque request and the torque estimate, then during a quasi-static variation phase of the torque request, determining, using the circuitry, that a torque anomaly is present as a function of the torque estimate, the torque request, and the torque specification.

6. The method as claimed in claim 5, wherein during the quasi-static variation phase when the driver's torque request is positive, if the torque estimate exceeds the upper limit, it is determined that the torque anomaly detected is an untimely acceleration when the driver's torque request is positive.

7. The method as claimed in claim 5, wherein during the quasi-static variation phase when the driver's torque request is positive, if the torque estimate falls below the lower limit, it is determined that the torque anomaly detected is a loss of propulsion.

8. The method as claimed in claim 5, wherein during the quasi-static variation phase when the driver's torque request is negative, if the torque estimate falls below the lower limit, it is determined that the torque anomaly detected is an overbraking.

9. The method as claimed in claim 5, wherein during the quasi-static variation phase when the driver's torque request is negative, if the torque estimate exceeds the upper limit, it is determined that the torque anomaly detected is a loss of braking.

10. The method as claimed in claim 5, wherein during the quasi-static variation phase when the driver's torque request is positive, and if the estimate of torque produced by the propulsion unit is both negative and below a specific threshold for the case of a positive driver's torque request, and less than the driver's torque request by a value at least equal to the value of another specific threshold for the case of a positive driver's torque request, it is determined that the torque anomaly is an untimely braking.

11. The method as claimed in claim 5, wherein during the quasi-static variation phase when the driver's torque request is negative, and if the estimate of torque produced by the propulsion unit is both positive and above a specific threshold for the case of a negative driver's torque request, and greater than the driver's torque request by a value at least equal to the value of another specific threshold for the case of a negative driver's torque request, it is determined that the torque anomaly is an untimely acceleration.

* * * * *